(12) United States Patent
Bartels et al.

(10) Patent No.: US 8,214,060 B2
(45) Date of Patent: Jul. 3, 2012

(54) BUILDING APPLIANCE CONTROLLER WITH SAFETY FEATURE

(75) Inventors: Jim I. Bartels, Hudson, WI (US); Timothy J. Nordberg, Edina, MN (US); Nathan Longen, White Bear Township, MN (US)

(73) Assignee: Honeywell International Inc., Morristown, NJ (US)

( * ) Notice: Subject to any disclaimer, the term of this patent is extended or adjusted under 35 U.S.C. 154(b) by 585 days.

(21) Appl. No.: 12/332,070

(22) Filed: Dec. 10, 2008

(65) Prior Publication Data

US 2010/0145475 A1 Jun. 10, 2010

(51) Int. Cl.
G05B 19/18 (2006.01)
G05B 9/02 (2006.01)
G05D 23/00 (2006.01)
F22B 37/42 (2006.01)
H05K 7/10 (2006.01)

(52) U.S. Cl. .......... 700/3; 700/79; 700/80; 700/81; 700/82; 236/51; 236/21 R; 236/94; 710/301; 710/313

(58) Field of Classification Search .......... 700/3, 79–82, 700/1; 236/21 R, 94, 51; 710/301, 313
See application file for complete search history.

(56) References Cited

U.S. PATENT DOCUMENTS

| | | | |
|---|---|---|---|
| 5,520,327 A * | 5/1996 | Shreeve et al. | ................. 236/10 |
| 5,748,466 A | 5/1998 | McGivern et al. | |
| 5,949,497 A | 9/1999 | Back | |
| 6,059,195 A | 5/2000 | Adams et al. | |
| 6,101,419 A | 8/2000 | Kennedy et al. | |
| 6,129,284 A * | 10/2000 | Adams et al. | ................. 236/21 R |
| 7,146,445 B2 | 12/2006 | Appleton et al. | |
| 7,242,116 B2 | 7/2007 | Kawazu et al. | |
| 2005/0083965 A1 | 4/2005 | Sodergren | |
| 2006/0272830 A1 | 12/2006 | Fima | |
| 2008/0177397 A1 * | 7/2008 | Davlin et al. | ................. 700/3 |

* cited by examiner

*Primary Examiner* — Albert Decady
*Assistant Examiner* — Jason Lin
(74) *Attorney, Agent, or Firm* — Seager Tufte & Wickhem LLC

(57) ABSTRACT

A building appliance controller is disclosed that includes a safety feature. In one illustrative embodiment, the building appliance controller may include a controller and a safety element. In some cases, the controller may include a control panel configured to provide an interface, and one or more option cards configured to communicate with the control panel via the interface and to provide additional functionality to the appliance controller. The safety element may include a first relay or other switching element that is configured to selectively pass power to the building appliance. In some illustrative embodiments, when an unsafe operating condition is detected by the control panel and/or the one or more option cards, the control panel and/or the one or more option cards may open the first relay of the safety element to cut off power to the building appliance. In some cases, a safety key may be passed between the control panel and the one or more option cards to help verify the safe operation of the building appliance.

22 Claims, 6 Drawing Sheets

BUILDING APPLIANCE CONTROLLER WITH SAFETY FEATURE

FIELD

The present disclosure relates generally to building appliance controllers, and more particularly, to building appliance controllers that include safety features.

BACKGROUND

Building appliances are commonly used to help manage and/or control environmental and/or other parameters within a building. Example building appliances may include forced air furnaces, boilers, water heaters, heat pumps, and/or other building appliances. In many installations, building appliances are required to meet certain operational safety standards. Such safety standards have been developed to help ensure the safe operation of such building appliances. In some cases, the safety standards require that a building appliance be shut down when an unsafe operating condition or other malfunction is detected.

In many installations, a building appliance controller is used to control a building appliance. The building appliance controller can be equipped with or coupled to a safety element that, when activated, deactivates at least a portion of the building appliance. As the functionality of such building appliances and/or appliance controllers increase, the complexity and costs of providing reliable safety features can also increase. Thus, there is an ongoing need to provide alternative building appliance controllers and methods of controlling building appliances that meet or exceed certain safety standards.

SUMMARY

The present disclosure relates generally to building appliance controllers, and more particularly, to building appliance controllers that include safety features. In one illustrative embodiment, a building appliance controller may include a controller and a safety element. In some cases, the appliance controller may include a control panel configured to provide a level of functionality to the appliance controller, and one or more option cards configured to provide additional functionality to the appliance controller. The safety element may include a first relay and/or other switching element that is configured to selectively pass power to the building appliance. In some illustrative embodiments, when an unsafe operating condition is detected by the control panel and/or the one or more option cards, the control panel and/or the one or more option cards may open the first relay of the safety element to cut off power to the building appliance. In some cases, a safety key may be passed between the control panel and the one or more option cards to help verify the safe operation of the building appliance and/or take additional action.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DETAILED DESCRIPTION

Figure 1:
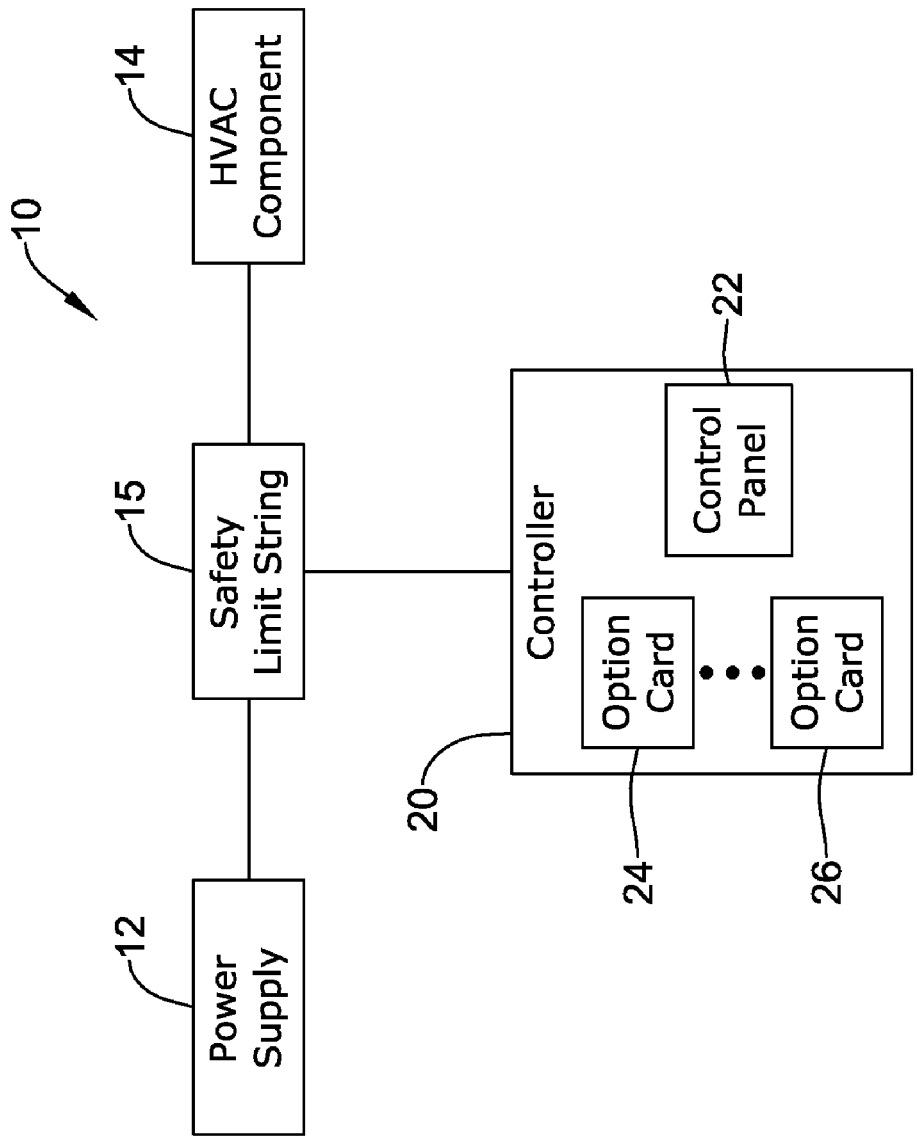
FIG. 1 is a block diagram of an illustrative control system for a heating, ventilation, and air conditioning (HVAC) appliance.

The following description should be read with reference to the drawings wherein like reference numerals indicate like elements throughout the several views. The detailed description and drawings show several embodiments which are meant to be illustrative of the claimed invention.

FIG. 1 is a block diagram of an illustrative control system 10 for a heating, ventilation, and air conditioning (HVAC) component 14. Example HVAC components 14 can include, but are not limited to, forced air furnaces, boilers, water heaters, heat pumps, and/or other HVAC appliances. In some cases, the illustrative HVAC component 14 may include a combustion chamber as a heat source. A combustible gas may be fed into the combustion chamber via a gas valve to regulate the flow of gas to the combustion chamber. In many cases, the HVAC component 14 may need to comply with certain operational safety standards.

The illustrative control system 10 may include an appliance controller 20 that is configured to control the operation of the HVAC component 14. To do this, the appliance controller 20 may be configured to monitor various parameters of the HVAC component 14 during operation, depending on the functionality of the controller 20. If one or more of the parameters are determined to create a potentially unsafe operating condition, the appliance controller 20 may enter a lockout state in which the combustion (and/or other) system may be shut down and/or the gas valve may be closed. When the lockout state is entered, the HVAC component 14 may cease operation or be prevented from initiating operation. Once the operating parameters of the HVAC component 14 are determined to be safe again, the appliance controller 20 may exit the lockout state.

In the illustrative embodiment, appliance controller 20 may include a control panel 22 and one or more option cards 24 and 26. In the illustrative embodiment, the control panel 22 includes a processor (e.g. microprocessor, microcontroller, etc.) and/or other hardware and/or software that is configured to allow additional functionality to be added with option cards. The one or more option cards 24 and 26 may each include a processor (e.g. microprocessor, microcontroller, etc.) and/or other hardware and/or software that is configured to provide additional functionality to the appliance controller 20. In one example, if the HVAC component 14 is a boiler, the option cards 24 and 26 may be configured to add additional functionality to the appliance controller 20, such as, additional temperature sensing, temperature setpoints, low water cutoff, mixing control, boiler staging, boiler reset with DW priority, as well as additional functionality or combination of functionality, as desired. The use of option cards 24 and 26 may allow more flexibility in the functionality and the ability to mix and match desired functionality of the appliance controller 20, depending on the installation.

The illustrative control system 10 may include a power supply 12 connected to the HVAC component 14 for providing operational power to the HVAC component 14. In some embodiments, the power supply 12 may include a 24 VAC step-down transformer, which may typically be provided near the HVAC component 14 and may be part of the HVAC system for supplying 24 VAC power to HVAC component 14. Alternatively, the HVAC component 14 may be powered by a 120 VAC power source or any other suitable power source, as desired.

In the illustrative embodiment, a safety element such as a safety limit string 15 may be provided between the power supply 12 and HVAC component 14 to selectively deactivate the HVAC component 14 according to a control signal received from the appliance controller 20. For example, in the event that an unsafe operating condition of the HVAC component 14 is detected by the appliance controller 20, the appliance controller 20 may enter a lockout state and signal the safety limit string 15 to interrupt power to a gas valve, heating element, and/or other component of the HVAC component 14. In essence, the safety limit string 15 may cause the immediate shut down of the HVAC component 14 or prevent operation of the HVAC component 14 in response to the detection of an unsafe operating condition by the appliance controller 20. In some embodiments, the safety limit string 15 may include a redundant set of relays (shown as 16 and 18 in FIG. 2), if desired.

It should be recognized that the illustrative appliance controller 20 of FIG. 1 is merely illustrative and is not meant to be limiting in any manner. Also, and while not shown, it is contemplated that the appliance controller 20 may include a user interface that may allow a user or technician to program and/or modify one or more control parameters of the appliance controller 20. In this case, the user interface may include a touch screen, a liquid crystal display (LCD) panel and keypad, a dot matrix display, a computer, buttons and/or any other suitable device, as desired. In one example, the user interface may include a three-digit fixed segment display and three buttons.

Figure 2:
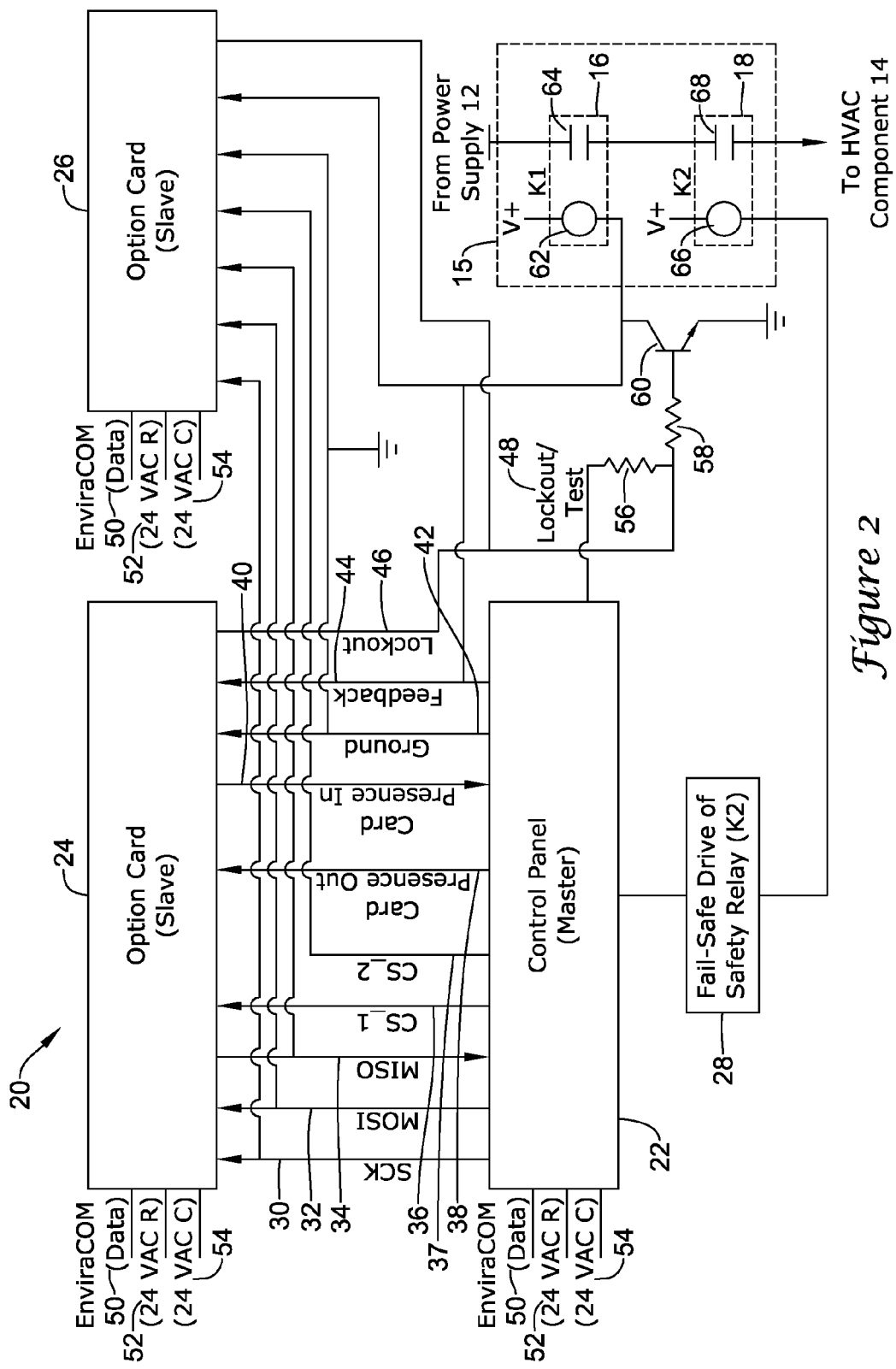
FIG. 2 is a schematic diagram of an illustrative controller and safety limit string of the illustrative control system of FIG. 1.

FIG. 2 is a schematic diagram of the illustrative appliance controller 20 and the safety element 15 of the control system 10 of FIG. 1. In the illustrative embodiment, the appliance controller 20 may include a control panel 22 (e.g. motherboard) and one or more option cards 24 and 26 (e.g. daughtercards). The control panel 22 and one or more option cards 24 and 26 may be configured to control the operation and/or functionality of the HVAC component 14 of FIG. 1. For example, the control panel 22 may be configured to have a number of slots, for example three slots, for connecting option cards 24 and 26. A first option card 24 may be configured to be an aquastat high temperature limit control. In this case, if the temperature of the HVAC component (e.g. boiler, etc.) exceeds a certain high temperature limit, the option card 24 may cause the operation of the HVAC component 14 to shut down by opening the safety element 15, which in some cases may include a first relay 16 and/or a second relay 18 connected in series (e.g. safety limit string). The opening of the safety element 15 may shut down the combustion of the HVAC component 14 by, for example, causing the gas valve to close.

In the example shown in FIG. 2, two option cards 24 and 26 are provided. However, in some cases, fewer or additional option cards may be added to the appliance controller 20, as desired. Option cards 24 and 26 may implement additional functionality and/or control for the HVAC component 14. Additional functionality may include, but is not limited to, additional aquastats, low water cutoff, flue limit, mixing control, boiler staging, boiler reset with DW priority, as well as any other functionality or combination of functions, as desired. In some cases, the option cards 24 and 26 may be configured to auto reset or may require manual reset, as desired.

Some of the option cards 24 and 26 may be required to help meet safety standards, while other option cards 24 and 26 may not. As will be discussed further below, the safety requirements of the option card may control how the option cards communicate with the control panel 22, such as if a safety key needs to be generated. In one example, the control panel 22 may be configured to receive up to three option cards 24 and 26, however, it is contemplated that the control panel 22 may be configured to receive more or less option cards, as desired. In some cases, the option cards may be of a uniform size or varying sizes, as desired.

In the illustrative embodiment of FIG. 2, the control panel 22 may include one or more interfaces configured to communicate with the one or more option cards 24 and 26. For example, the interface between the control panel 22 and each of the option cards 24 and 26 may include an EnviraCOM™ connection, a Serial Peripheral Interface (SPI) connection, a relay control connection, a ground connection, and/or a card presence connection. In this illustrative embodiment, a 12-pin interface may be provided, however, any other suitable interface connection may be provided as desired.

The EnviraCOM™ connection can operate in accordance with a 3-wire communication protocol that allows the connected controllers to, for example, publish information relating to status, alarms, etc. on a building control network. The information may include flame signal strength or resistance, number of cycles, run time, alarm information, diagnostics information, etc. In the illustrative example, the EnviraCOM™ connection may include a three pin connection that includes a data wire 50, a 24 VAC R wire 52, and a 24 VAC C wire 54. The data wire 50 may be a bi-directional data line used for EnviraCOM™ communications. The 24 VAC connections 52 and 54 may provide power to the option cards 24 and 26. The 24 VAC R wire 52 may be a connection to a R terminal of a 24 volt AC transformer (not shown). The 24 VAC C wire 54 may be a connection to a C terminal of the 24 volt AC transformer (not shown).

In the illustrative embodiment, the SPI connection may include a three-wire interface of the control panel 22 that may be common to all the option cards 24 and 26. The SPI connection may be used to communicate messages between the control panel 22 and the option cards 24 and 26. Example data that may be communicated between the control panel 22 and the option cards 24 and 26 may include display configuration information, such as LED display and button use (not shown) and/or a safety key "handshake" to keep the safety limit string closed. The three-wire SPI interface can include a serial clock (SCK) port 30, a Master Output Slave Input (MOSI) port 32, and a Master Input Slave Output (MISO) port 34.

The SPI may also include one or more card select (CS_X) ports 36 and 37 that may be used to select one of the option cards 24 and 26, respectively. For example, option card 24 may be coupled to CS_1 and option card 26 may be coupled to CS_2. In this example, the card select ports 36 and 37 may implement 0-5 volt digital logic to indicate the selected card. For example, when the respective card select signal 36 or 37 is pulled low (e.g. zero volts), it may signal to the corresponding option card 24 or 26 that the option card 24 or 26 is the desired recipient of the data on the SPI connection. In some cases, the SPI communication may implement 0-5 volt digital logic for communication, if desired.

In the illustrative embodiment, the control panel 22 may be the "master" and the options cards 24 and 26 may be the "slaves". In this case, the control panel 22 may be the master of communication over the SPI connection. The control panel 22 may drive the clock signal, place data on the MOSI line for the option cards 24 and 26 to read, and read the MISO line for input data received from the option cards 24 and 26. In one example, the SPI clock may be generated from the control panel 22 (e.g. master) at a rate of 62,500 bits per second +/−15%. However, any suitable clock may be used, as desired.

In one example communication method, the control panel 22 (e.g. master) may initiate communication with option card 24 or option card 26 by driving the respective CS_X line 36 or 37 low. The control panel 22 may then serially transmit a message to the selected option card 24 or 26 (e.g. slave). The message may be sent serially one (1) bit at a time with a short idle gap between bits, such as less than 1 milliseconds, or less than 350 microseconds, as desired. The CS_X line may remain low until the master finishes transferring an entire message packet to the selected slave. At the end of the message, the SPI bus may be idle for at least one line cycle before the control panel 22 drives the clock signal to receive a response from an option card 24 or 26.

In the illustrative embodiment, the control panel 22 and the option cards 24 and 26 may communicate using a defined message packet. In some cases, the message packet may include a header field, a length field, a data field, and a cyclic redundancy check (CRC) field. In one example, the message packet may include a one byte header field, a one byte length field, a "N" byte data field (where N is any integer), and a two byte 16-bit CRC checksum. However, it is contemplated that any suitable communication protocol may be used, including those communication protocols approved by UL to meet UL1998 standards, as desired.

The illustrative relay control connection may include a feedback wire 44 and a lockout line 46. Both the feedback line 44 and the lockout line 46 may be common to all of the option cards 24 and 26. The feedback and lockout lines 44 and 46 can be used to control a relay 16 of the safety element 15 and to determine if a drive component, such as a NPN transistor 60, is functioning properly. In addition, a ground line 42 may be common to all of the option cards 24 and 26 to provide a common ground.

The feedback line 44 may be an input line to verify the capability of the option card 24 and 26 to actively control the safety element 15. In the illustrative embodiment, the feedback line 44 is connected to the collector of the NPN transistor 60, and may be used to sense the voltage at that node. In one example, the feedback line 44 may be close to zero volts when NPN transistor 60 is turned on and relay 16 is energized. When the transistor 60 is turned off and the relay 16 is de-energized, the feedback line 44 may transition to a supply voltage, such as V+. While an NPN transistor 60 is shown, it is contemplated that any suitable switching device may be used, as desired.

The lockout line 46 may be connected to an open collector output of each of the option cards 24 and 26, as well as to the base of NPN transistor 60 through resistor 58. In the illustrative embodiment, the collector of the NPN transistor 60 is connected to a resistive coil 62 of relay 16, and the emitter is connected to ground. To open the relay 16 of safety element 15, one or both of cards 24 and/or 26 can pull down the lockout line 46 via their open collector output, which in turn, turns off NPN transistor 60. This causes the collector of NPN transistor 60 to rise to the voltage of V+, thereby de-energizing the resistive coil 62 of relay 16. When the resistive coil 62 of relay 16 is de-energized, contacts 64 of relay 16 open, as the contacts 64 are forced closed by a magnetic field produced by an energized resistive coil 62 (i.e. normally open relay). The option cards 24 and 26 may thus control the state of the relay 16 via lockout line 46. The control panel 22 may include or be connected to a lockout/test line 48, which can be connected to the lockout line 46 through resistor 56. The lockout/test line 48 can be used by the control panel 22 to lockout the relay 16 as described above, and/or test the lockout functionality of the safety element 15.

Each card 24 and 26 may be connected to a Card Presence Out line and a Card Presence In line, if desired. In FIG. 2, only card 24 includes a Card Presence Out line 38 and a Card Presence In line 40. However, it is contemplated that card 26 may also include a Card Presence Out line and a Card Presence In line. The Card Presence Out line(s) and Card Presence In line(s) may be used by the control panel 22 to determine when a specific option card 24 or 26 is present. Each of the option cards 24 and 26 may simply short the corresponding Card Presence Out line and Card Presence In line so that the control panel 22 may place a voltage on the Card Presence Out wire 38 and sense a voltage on the Card Presence In wire 40 to determine if the corresponding option card 24 and 26 is connected.

In some embodiments, the safety element 15 may include a second relay 18. The second relay 18 may be connected in series with the first relay 16, and may provide redundancy. Similar to relay 16, relay 18 may include a resistive coil 66 that, when energized, creates a magnetic field that causes its contacts 68 to close. As such, when resistive coil 66 of relay 18 is de-energized, its contacts 68 will open (e.g. normally open relay). A Fail-Safe Drive of Safety Relay 28 module may be provided to drive relay 18 according to a control signal received from the control panel 22.

One or more of the option cards 24 and 26 may, in some cases, perform a safety check on certain software and/or hardware of the card. In some cases, all of the cards 24 and 26 perform one or more internal safety checks. In other cases, only some of the cards 24 and 26 perform such safety checks. Those cards 24 and 26 that perform safety checks may execute an algorithm that checks the operation of software and/or hardware of the card. In some cases, the safety algorithm may generate a safety key. This safety key may not be "known" to the card in advance, meaning that it cannot simply be a stored as a value in a memory location. Rather, the safety key must be generated through the execution of the safety algorithm. It is contemplated that the safety key of each or selected cards may be periodically cleared and re-generated. Option cards which are not required to perform safety checks may still be required to possess a safety key, but may simply store a safety key value in a memory location and may transmit the stored safety key value when requested.

During operation, the option cards 24 and 26 may periodically communicate the safety key to the control panel 22. The control panel 22 may also posses a safety key. If the safety key of the control panel 22 does not match the safety key of the option card 24 and/or 26, the option card 24 and 26 and/or the control panel 22 may open relay 16 of the safety element 15. For example, if an option card 24 or 26 has determined that the safety element 15 must be opened, the option card 24 or 26 may drive the lockout line 46 low in order to de-energize relay 16. Then, the option card 24 or 26 may verify that the relay 16 was properly de-energized by reading the appropriate voltage level on the feedback line 44. The option card 24 or 26 may also send a message to the control panel 22 either on its own or in response to a message, such as in response to a Key Request or Key Clear message, to indicate that the safety element 15 should indeed be open.

On receipt of this message, the control panel 22 may drive lockout line 48 low to de-energize relay 16 (in case the option card 24 or 26 failed to do so) and may signal the Fail-Safe Drive of Safety Relay 28 to de-activate relay 18 to provide redundant control. Also, in some embodiments, the option cards 24 and/or 26 may send an appropriate error messages on the EnviraCOM™ connection. If the option cards 24 and/or 26 fails to receive periodic Key Request and/or Key Clear messages, the option card can be configured to drive the lockout line 46 low until periodic Key Request and/or Key Clear Messages are received again. Also, the option cards 24 and/or 26 may send an appropriate error messages on the EnviraCOM™ connection.

As illustrated, the control panel 22 and the option cards 24 and 26 may control the operational power (or other control signal) provided to a HVAC component 14 using a safety element 15. In the illustrative embodiment, both the control panel 22 and option cards 24 and 26 may be configured to provide an output to control a single relay 16 of the safety element 15, and thus may not require different relays for each card. In this case, additional option cards may be added to the controller 20 without requiring the addition of components (e.g. relays) to the safety element 15, and each option card may still be able to de-activate relay 16. In some cases, the option cards 24 and 26 may be configured to only deactivate (open) relay 16 and not to active (close) relay 16, if desired.

FIGS. 3-6 are flow diagrams of illustrative methods of communicating between the control panel 22 and the options cards 24 and 26 under different operating conditions. In the illustrative embodiment, the control panel 22 may send messages requesting a safety key from the option cards 24 and 26 (e.g. Key Request) and may periodically send messages requesting the key to be cleared (e.g. Key Clear). In response to these messages, the option cards 24 and 26 may send a Key Transmit message or an Open Limit message, which are discussed further below. Furthermore, other messages may be communicated between the control panel 22 and the option cards 24 and 26 that may or may not pertain to safety, as desired.

Figure 3:
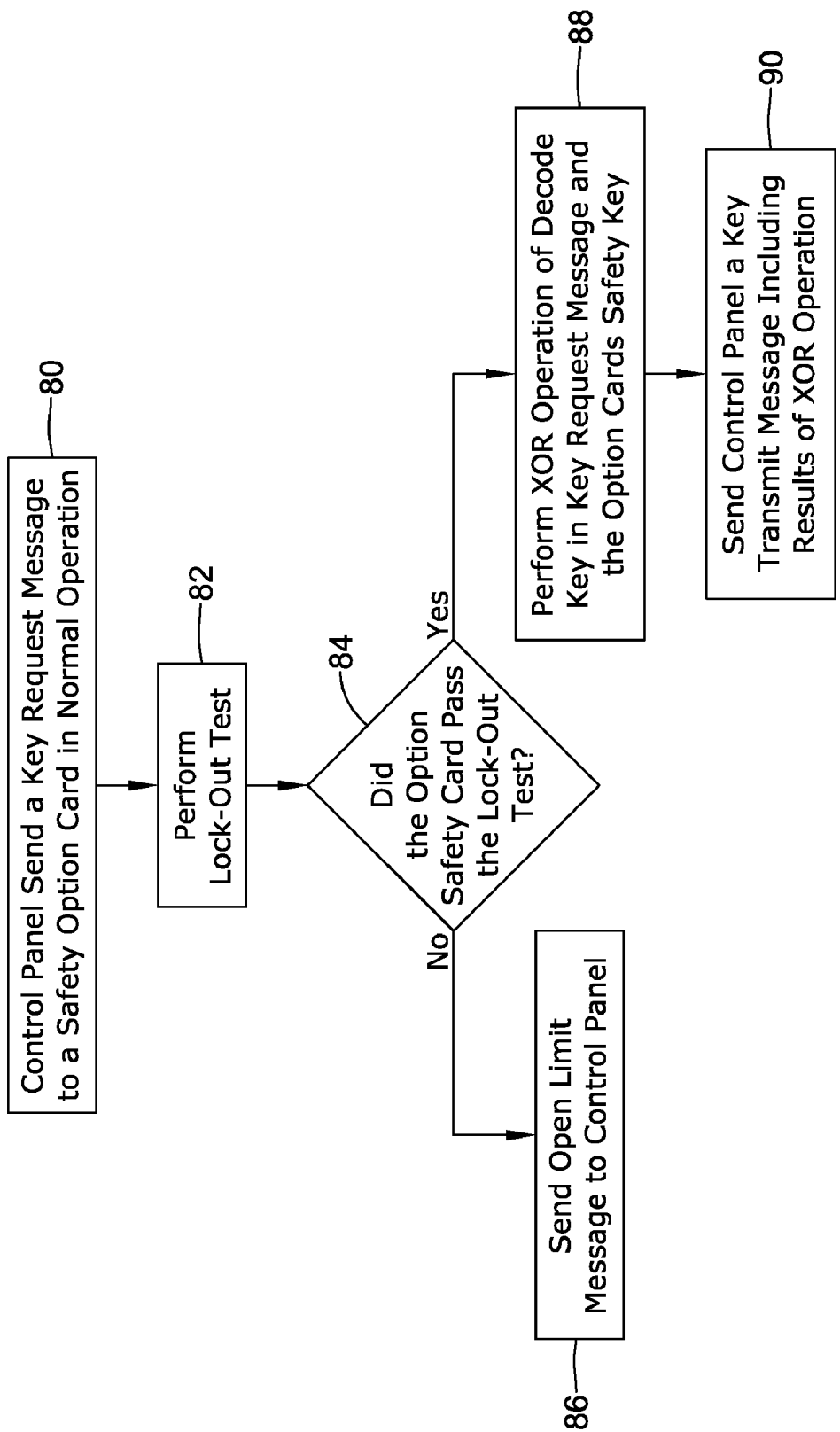
FIGS. 3-6 are flow diagrams of illustrative methods of communicating between a control panel of the appliance controller and an option card of the appliance controller under different operating conditions.

FIG. 3 is a flow diagram of an illustrative periodic Key Request message from the control panel 22 to an option card 24 and/or 26 during normal operation. As illustrated in block 80, the control panel may send a Key Request message to a card during normal operation (e.g. with no safety limit condition present). In some cases, the Key Request message can be sent periodically, such as at random or scheduled intervals, as desired. In one illustrative example, the Key Request message may include a decode key (e.g. safety key of the control panel 22) to the option card(s).

Once the option card(s) receives the Key Request message, in block 82, the option card may perform a lockout test. A lockout test can be performed to verify that an option card has the ability to de-energize the relay of the safety element. One example method of performing a lockout test may include driving the lockout line 46 low and verifying that the feedback line 44 changes from ground state to V+. In some cases, this test may be performed momentarily or in a period of time that may not cause the relay 16 of the safety element 15 to open. However, other methods of performing the lockout test may be used, as desired.

Then, in block 84, the option card may determine if the lockout test was completed successfully. If the lockout test was not completed successfully, then, in block 86, the option card can send the control panel an Open Limit message indicating that the control panel 22 should open the safety element 15 because of the failed test. In some cases, the option card may continue to drive the lockout line low to try and open the relay of the safety element 15. Also, in some installations, the option card may send an appropriate error messages over the EnviraCOM connection.

If the lockout test of block 82 is completed successfully, and not other internal error are present, normal operation of the HVAC component may continue and, in block 88, the option card may take the decode key sent in the data field of the Key Request message and perform an XOR operation with the option card's internally generated safety key. Next, in block 90, the option card may send the control panel a Key Transmit message containing the result of the XOR operation to the control panel 22. Once received, the control panel 22 may compare the results of the XOR operation with an expected value, and if there is a match, the control panel 22 may leave the safety element 15 energized or closed. If there is not a match, or a fault is otherwise detected, the control panel 22 may de-energize or open the safety element, either through lockout/test line 48 and/or Fail Safe Drive Safety Relay 28.

Figure 4:
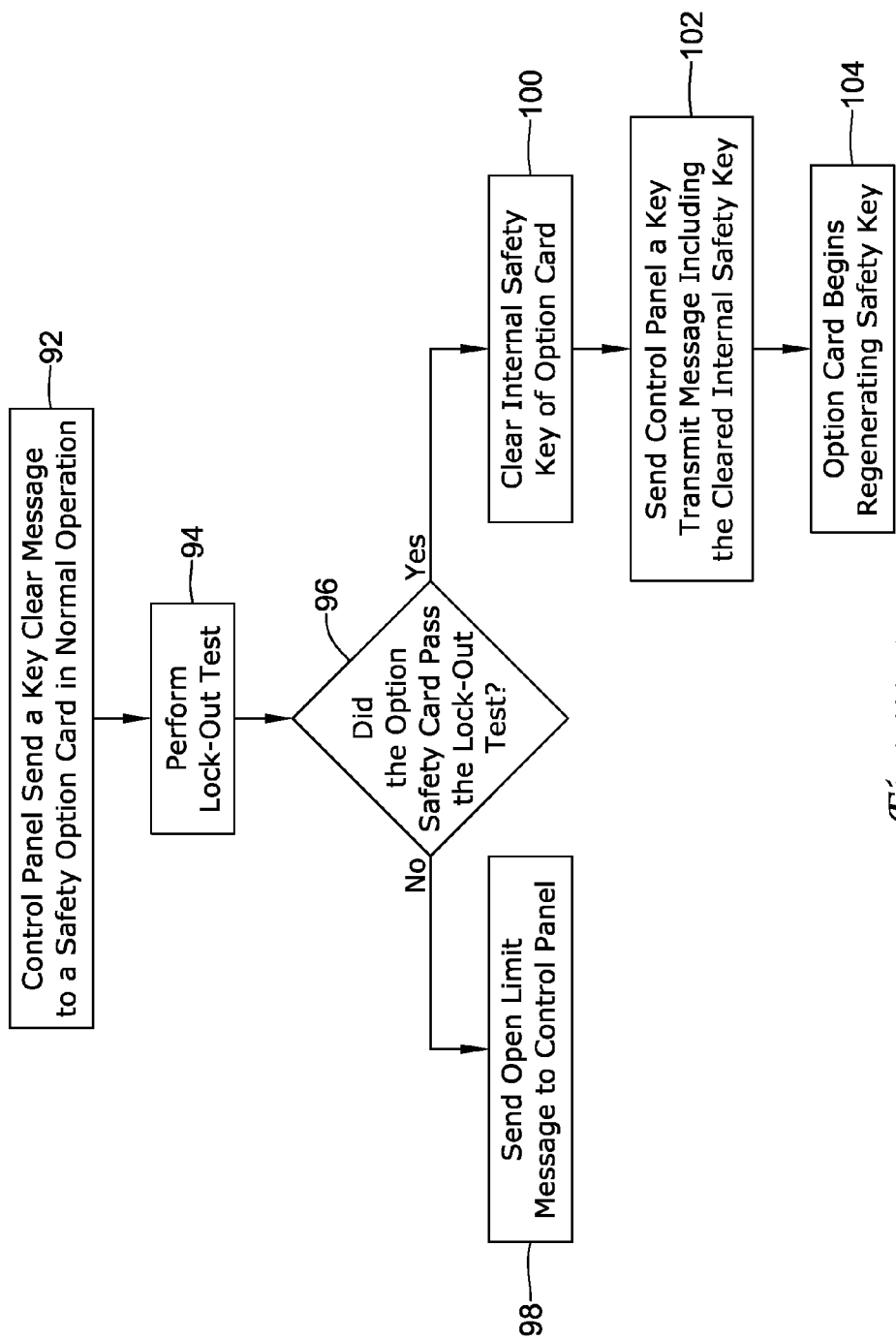

FIG. 4 is a flow diagram of an illustrative periodic key clear message from the control panel to an option card that is operating in normal operation. As illustrated in block 92, the control panel 22 may send a Key Clear message to an option card that is running in normal operation (e.g. no safety limit condition present). In some cases, the Key Clear message can be sent periodically, at random intervals, or at scheduled intervals, as desired. The Key Clear message can request that the option card destroys its current internally generated safety key, and re-generate the safety key.

Once the option card receives the Key Clear message, in block 94, the option card may perform a lockout test. As discussed above, the lockout test can be performed to verify that an option card has the ability to de-energize the relay 16 of the safety element 15. In block 96, the option card may determine if the lockout test was completed successfully. If the lockout test was completed successfully, in block 100, the option card can clear its internal safety key from memory. Then, in block 102, the option card can send the control panel a Key Transmit message containing the cleared internal safety key. After transmitting the cleared safety key, in block 104, the option card can begin re-generating its safety key by performing a test of its safety functions. If, however, the lockout test was not completed successfully, then in block 98, the option card can send the control panel an Open Limit message, similar to block 86 as discussed above.

Figure 5:
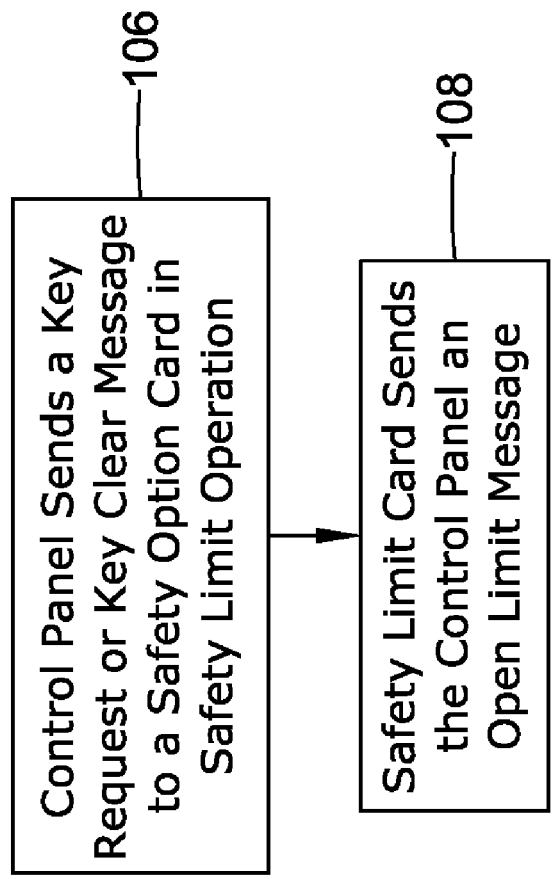

FIG. 5 is a flow diagram of an illustrative periodic Key Request or Key Clear message from the control panel 22 to an option card that is operating with a safety condition present. In block 106, the control panel sends a Key Request message or a Key Clear message to the option card. In response to receiving the message, in block 108, the option card can send the control panel an Open Limit message. The Open Limit message may instruct the control panel to open the safety element 15. In other words, the Open Limit message may indicate to the control panel 22 that an safety condition is present, and that the control panel 22 should de-energize the relay 16 as well as the relay 18 (although relay 16 should already be de-energized by the option card).

Figure 6:
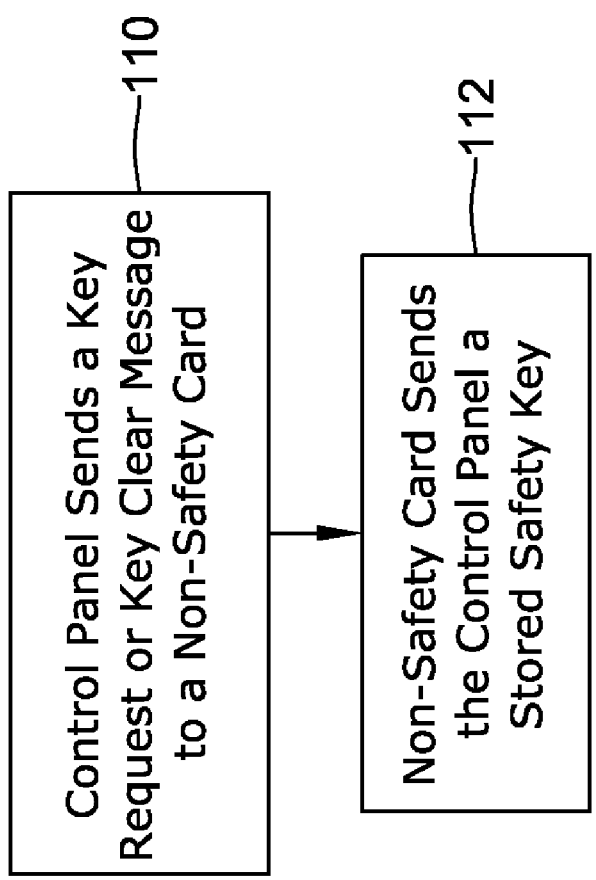

FIG. 6 is a flow diagram of an illustrative periodic Key Request or Key Clear message from the control panel to an option card that does not need to perform a safety check. As indicated above, some cards may not need to perform safety check operations (non-safety option card). In block 110, the control panel 22 may send a Key Request or Key Clear message to such a non-safety option card. In response to the message, in block 112, the non-safety option card can send the control panel a stored key. If the message is a Key Request message, the non-safety option card can send the control panel 22 a stored safety key having a key value and if the message is a Key Clear message, the option card can send the control panel a zero value key.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A building appliance controller for controlling a building appliance, comprising:
   a controller for controlling the building appliance, the controller including a control panel and one or more option cards, the control panel configured to provide an interface configured to communicate with the one or more option cards, wherein the one or more option cards are configured to communicate with the control panel over the interface and to provide additional control functions to the controller when controlling the operation of the building appliance; and
   a safety element configured to selectively switch power to the building appliance, wherein the safety element includes a first switch that can be opened by the control panel and the one or more option cards when an unsafe operating condition is detected by the control panel and/or the one or more option cards.

2. The building appliance controller of claim 1 wherein the unsafe operating condition is detected when a safety key generated by the one or more option cards does not correlate with a safety key of the control panel.

3. The building appliance controller of claim 1 wherein the controller includes a transistor that is configured to open and close the first switch of the safety element, wherein the control panel and one or more option cards are electrically coupled to the transistor via a lockout line to selectively energize and de-energize the transistor.

4. The building appliance controller of claim 3 wherein the first switch includes a first relay having a relay coil, and the control panel and one or more option cards are coupled to the base of the transistor and the relay coil of the first relay is coupled to the collector of the transistor.

5. The building appliance controller of claim 4 wherein the one or more option cards are connected to a feedback line that is coupled to the collector of the transistor.

6. The building appliance controller of claim 5 wherein the one or more option cards are configured to drive the lockout line low and read the resulting voltage on the feedback line.

7. The building appliance controller of claim 1 wherein the safety element is provided between a power source and a component of the building appliance.

8. The building appliance controller of claim 7 wherein the safety element includes a second relay provided in series with the first relay to provide redundant safety control, wherein the control panel is configured to open the second relay when an unsafe operating condition is detected.

9. The building appliance controller of claim 8 wherein the safety element only includes the first relay and the second relay.

10. A building appliance controller for controlling a building appliance, comprising:
    a controller for controlling the building appliance, the controller including a control panel and one or more option cards, wherein the one or more option cards provide additional control functions to the controller when controlling the operation of the building appliance;
    the control panel includes a safety key and the one or more option cards generate a safety key by testing the operation of the one or more option cards, wherein the control panel is configured to send a message to the one or more option cards requesting the generated safety key, wherein an unsafe operating condition is present when the safety key generated by the one or more option cards does not match the safety key of the control panel; and
    a safety limit string configured to selectively switch power provided to the building appliance, wherein the safety limit string includes a first relay that can be opened by the control panel and the one or more option cards when an unsafe operating condition is detected.

11. The building appliance controller of claim 10 wherein the safety limit string includes a second relay provided in series with the first relay to provide redundant safety control, wherein the control panel is configured to open the second relay when an unsafe operating condition is detected.

12. The building appliance controller of claim 11 wherein the one or more option cards are configured to perform a lockout test that tests the ability of the one or more option cards to open the first relay when a message is received from the control panel.

13. The building appliance controller of claim 12 wherein the one or more option cards send the control panel a message to open the first relay and/or the second relay when the one or more option cards fails the lockout test.

14. The building control system of claim 10 wherein the control panel is configured to send messages to the one or more option cards requesting that the one or more options cards clear the generated safety key and regenerate a new safety key.

15. A method of providing safety control for a building appliance, wherein a controller for the building appliance includes a control panel and one or more option cards, the method comprising:
    providing a safety element to selectively interrupt power to the building appliance, the safety element including a first relay;
    determining when an unsafe operating condition is present via one or more of the option cards, and when present, asserting an output of one or more of the option cards to open the first relay of the safety element; and
    determining when an unsafe operating condition is present via the control panel, and when present, asserting an output of the control panel to open the first relay of the safety element.

16. The method of claim 15, wherein the safety element includes a second relay in series with the first relay, the method further comprising:
    opening the second relay of the safety element with the control panel when an unsafe operating condition is determined to be present by either the control panel or the one or more option cards.

17. The method of claim 15, wherein the control panel determines when an unsafe operating condition is present by generating a safety key in the one or more option cards and comparing the generated safety key to a safety key of the control panel, wherein an unsafe operating condition is determined to be present when the generated safety key does not correspond to the safety key of the control panel.

18. The method of claim 15, wherein the one or more of the option cards determines when an unsafe operating condition is present by testing the ability of the one or more option cards to open the first relay of the safety element.

19. A method of providing safety control in an appliance controller, wherein the appliance controller is configured to control a building appliance and includes a control panel and one or more option cards, the control panel providing an interface to communicate with the one or more option cards and the one or more option cards adding additional functionality to the appliance controller, the method comprising:

generating a safety key within one or more option cards;

comparing the generated safety key of the one or more option cards to a safety key of the control panel; and if the generated safety key of the one or more option cards does not correspond to a safety key of the control panel, opening a safety element to interrupt power to the building appliance.

20. The method of claim 19, further comprising:

clearing the generated safety key of the one or more option cards according to a request from the control panel; and regenerating a safety key for the one or more option cards.

21. The method of claim 19, further comprising:

testing the ability of the one or more option cards to open the safety element; and if the one or more option cards cannot open the safety element, opening the safety element.

22. The method of claim 19 wherein the safety element includes a first relay and series connected second relay, wherein the control panel and the one or more option cards can open the first relay and the control panel can open the second relay.

* * * * *